United States Patent [19]
Appell et al.

[11] Patent Number: 5,756,010
[45] Date of Patent: May 26, 1998

[54] PROTECTIVE EYESHIELD

[75] Inventors: Charles Howard Appell, Rochester; Raymond Thomas Jones, Webster, both of N.Y.

[73] Assignee: Eastman Kodak Company, Rochester, N.Y.

[21] Appl. No.: 667,272

[22] Filed: Jun. 20, 1996

[51] Int. Cl.$^6$ .................... F21V 9/04; G02C 7/10
[52] U.S. Cl. .................... 252/589; 351/163; 2/15
[58] Field of Search .................... 252/582, 589; 2/15, 426, 431; 351/163

[56] References Cited

U.S. PATENT DOCUMENTS 3,382,183  5/1968  Donolan et al.
4,045,229  8/1977  Weber, II et al. .................... 252/589
4,824,902  4/1989  Chen .................... 524/611
5,385,815  1/1995  Schofield et al. .................... 430/512
5,429,909  7/1995  Kaszczuk et al. .................... 430/273
5,468,591  11/1995  Pearce et al. .................... 430/201
5,510,227  4/1996  DoMinh et al. .................... 430/269
5,529,884  6/1996  Tutt et al. .................... 430/269
5,576,144  11/1996  Pearce et al. .................... 430/270.15

OTHER PUBLICATIONS

Research Disclosure 14977, Sep., 1976.

*Primary Examiner*—Philip Tucker
*Attorney, Agent, or Firm*—Carl F. Ruoff

[57] ABSTRACT

The present invention provides a UVA protective eyeshield that includes a transparent substrate having dispersed therein an effective amount of 1-di-n-hexylamino-4,4-dicyanobutadiene.

2 Claims, 1 Drawing Sheet

PROTECTIVE EYESHIELD

FIELD OF THE INVENTION

The present invention relates to a protective eyeshield. More particularly, the present invention provides an eyeshield that is effective in blocking all types of UV radiation and especially UVA radiation.

BACKGROUND OF THE INVENTION

According to the CIE, (International Commission on Illumination) UV radiation (200 to 400 nm) is divided into three regions. UVA radiation includes wavelengths between 315 nm and 400 nm, UVB radiation includes wavelengths between 290 to 315 nm, and UVC radiation includes wavelengths below 290 nm. Historically dangers of UVB and UVC radiation to the human eye have been known, and protective eyewear have been made available for these wavelengths. UVA radiation has been considered only slightly more damaging to the human eye than visible light (400–700 nm).

Recent studies have shown this assumption to be false. UVA radiation exposure has been implicated in cataract formation. Subsequent to the publication of these findings, the demand for UVA protective eyewear has increased. Many compounds are available that can absorb UVA radiation, but most of these also absorb significant amounts of visible radiation as well and produce an unwanted discoloration. Therefore, the ideal UVA blocker would have a 0% transmission below 400 nm and 100% transmission above 400 nm. This ideal material would also be resistant to photolytic bleaching thus maintaining its light-blocking properties after prolonged UV exposure. The present invention provides an eyewear that meets these requirements.

SUMMARY OF THE INVENTION

The present invention is an eye shield that includes a transparent substrate having dispersed therein an effective amount of 1-di-n-hexylamino-4,4-dicyanobutadiene. The present invention blocks essentially all transmission below about 400 nm and transmits essentially 100% of the radiation above 400 nm.

For a better understanding of the present invention together with other objects, advantages and capabilities thereof, reference is made to the following description and appended claims in connection with the above-described drawings.

DESCRIPTION OF THE PREFERRED EMBODIMENT

Figure 1:
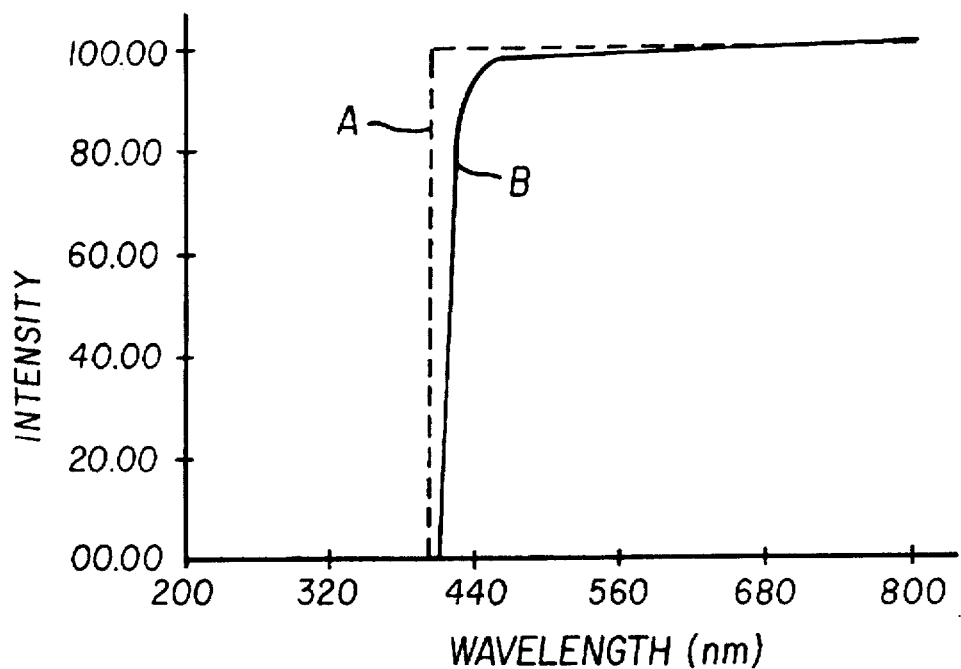
FIG. 1 shows the transmission spectrum of 1-di-n-hexylamino-4,4-dicyanobutadiene and simulated spectrum of an ideal UVA blocker.

Referring to FIG. 1, line A shows the ideal transmittance versus wavelength function for providing complete protection from UVA radiation. Line B shows the transmittance veresus wavelength function of 1-di-n-hexylamino-4,4-dicyanobutadiene. As seen in comparing lines A and B, 1-di-hexylamino-4,4-dicyanobutadiene is almost a replication of the ideal UVA transmittance curve.

In addition to having a proper transmittance, the UVA absorber must also meet other criteria. A useful UVA absorber must be light fast and compatable with all other materials in the plastic or glass substrate in order to be useful as an eyeshield. In addition, such a UVA absorber must have a photolytic stability so that it does not break down after prolonged exposure to sunlight. Finally, the proper UVA absorber must also be colorless when incorporated into the substrate.

A prototype UVA blocking lens material was prepared by hand coating cellulose acetate butyrate dyed with 0.44 weight percent of 1-di-n-hexylamino-4,4-dicyanobutadiene and 0.44 weight percent of UVINUL 3093, a commercially available UVB and UVC blocking dye from BASF.

Figure 2:
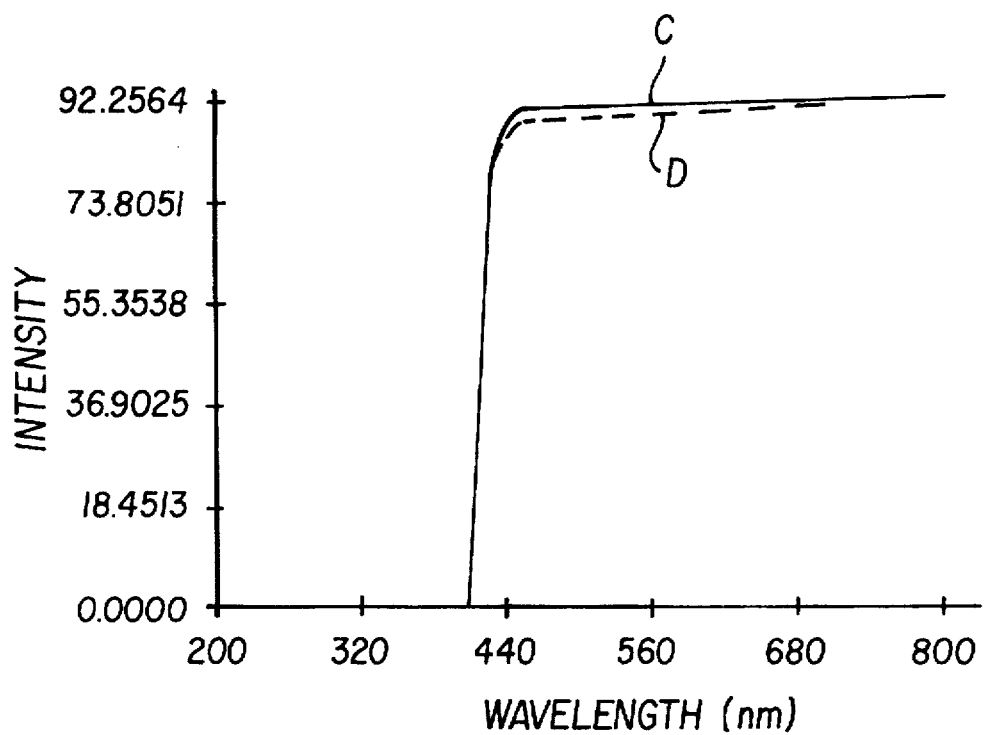
FIG. 2 shows the transmission spectrum of 1-di-n-hexylamino-4,4-dicyanobutadiene at one week and after four weeks of exposure to high intensity simulated sunlight.

ASTM-2092 (American Society of Testing & Materials) was used as a guideline in determining the photolytic stability of the prototype lens material. The prototype lens was exposed to high intensity simulated sunlight, of 400 Klux Xenon arc lamp, for four weeks. Spectra of the prototype before (line C) and after (line D) are shown in FIG. 2. As can be seen from FIG. 2, the prototype has maintained its UV blocking properties. There has been some slight decrease in percent transmission observed in the 400 to 500 nanometer region. There was also some degree of discoloration which was consistent with the amount of photooxidation expected in the cellulose acetate butyrate under these conditions.

Thus, the present invention provides a UVA blocker which prevents essentially all transmission below about 400 nanometers and allows almost all transmission above 400 nanometers. The present invention also provides a protective eyewear that is essentially colorless and is very stable.

Various organic plastic substrates are available which would be suitable for use with the UVA absorbing dye 1-di-n-hexylamino-4,4-dicyanobutadiene. Examples include cellulose derivatives such as cellulose nitrate, cellulose acetate and the like, regenerated cellulose and cellulose esters, for example, ethyl and methyl cellulose. Polystyrene plastics such as polystyrene per se or polymers and copolymers of various ring-substituted styrenes are also useful as substrates for the present invention. Another class of useful substrates includes various vinyl polymers and copolymers thereof such as polyvinyl butyrals and other acetals, polyvinyl chloride, polyvinyl acetate and its hydrolysis products. Acrylic resins are also suitable, as are polyolefins such as polyethylene, polypropylene and the like. Polyesters and unsaturated modified polyester resins such as those made by condensation of polycarboxylic acids are also suitable candidates.

In use, the dye of the present invention be incorporated in any of the above-identified materials is applied as a coating on suitable transparent substrates of plastic or glass. If this dye is coated, it must be incorporated with a binder. This is done by several known procedures including solution casting or dipping, hot milling, burnishing and/or dyeing. Organic plastic material can be molded into the formed articles.

The invention has been described in detail with particular reference to certain preferred embodiments thereof, but it will be understood that variations and modifications can be effected within the spirit and scope of the invention.

What is claimed:

1. An eyeshield comprising a transparent cellulose acetate butyrate substrate having dispersed therein an effective amount of 1-di-n-hexylamino-4,4-dicyanobutadiene to prevent UVA radiation transmission through the substrate.

2. An eyeshield comprising a colorless transparent cellulose acetate butyrate substrate having dispersed therein an effective amount of 1-di-n-hexylamino-4,4-dicyanobutadiene to prevent UVA radiation transmission through the substrate.

* * * * *